United States Patent
Fang et al.

(10) Patent No.: US 12,137,357 B2
(45) Date of Patent: Nov. 5, 2024

(54) METHOD OF PERFORMANCE INFORMATION REPORTING

(71) Applicant: ZTE Corporation, Guangdong (CN)

(72) Inventors: Jianmin Fang, Guangdong (CN); Jing Liu, Guangdong (CN); Dapeng Li, Guangdong (CN); He Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 279 days.

(21) Appl. No.: 17/400,537

(22) Filed: Aug. 12, 2021

(65) Prior Publication Data
US 2022/0022058 A1   Jan. 20, 2022

Related U.S. Application Data

(63) Continuation of application No. PCT/CN2019/074850, filed on Feb. 12, 2019.

(51) Int. Cl.
*H04W 24/02* (2009.01)
*H04W 24/08* (2009.01)
(Continued)

(52) U.S. Cl.
CPC ........... *H04W 24/02* (2013.01); *H04W 24/08* (2013.01); *H04W 36/0058* (2018.08);
(Continued)

(58) Field of Classification Search
CPC ..... H04W 24/02; H04W 24/08; H04W 24/10; H04W 76/19; H04W 76/18; H04W 76/15;
(Continued)

(56) References Cited

U.S. PATENT DOCUMENTS

| | | | |
|---|---|---|---|
| 8,780,732 B2 | 7/2014 | Song et al. | |
| 10,812,239 B2 | 10/2020 | Gao et al. | |

(Continued)

FOREIGN PATENT DOCUMENTS

| | | |
|---|---|---|
| CN | 101754372 A | 6/2010 |
| CN | 101841544 A | 9/2010 |

(Continued)

OTHER PUBLICATIONS

European Communication pursuant to Article 94(3) EPC issued in EP Patent Application No. 19914978.2, dated Aug. 4, 2023, 6 pages.

(Continued)

*Primary Examiner* — Rasheed Gidado
(74) *Attorney, Agent, or Firm* — Perkins Coie LLP

(57) ABSTRACT

Methods, systems, and devices related to related to digital wireless communication, and more specifically, to techniques related to reporting performance information. In one exemplary aspect, a method for wireless communication includes receiving a performance information report from a terminal, wherein the performance information report includes information relating to performance of the network node. The method also includes initiating a performance task based on receiving the performance information report. In another exemplary aspect, a method for wireless communication includes generating a performance information report that includes information relating to performance of a network node. The method also includes transmitting the performance information report to the network node.

16 Claims, 9 Drawing Sheets

(51) Int. Cl.
*H04W 36/00* (2009.01)
*H04W 74/08* (2024.01)
*H04W 74/0833* (2024.01)
*H04W 76/25* (2018.01)

(52) U.S. Cl.
CPC ... *H04W 36/0079* (2018.08); *H04W 74/0833* (2013.01); *H04W 76/25* (2018.02); *H04W 36/00838* (2023.05)

(58) Field of Classification Search
CPC ......... H04W 36/0079; H04W 36/0058; H04W 36/305; H04W 36/0027; H04W 36/0069; H04W 36/0083; H04W 74/0833; H04W 74/08; H04W 72/085
See application file for complete search history.

(56) References Cited

U.S. PATENT DOCUMENTS

| | | | |
|---|---|---|---|
| 2004/0203721 A1 | 10/2004 | Grooms | |
| 2012/0039166 A1 | 2/2012 | Gao | |
| 2012/0282968 A1* | 11/2012 | Toskala | H04W 24/10 455/517 |
| 2013/0315075 A1 | 11/2013 | Tamura et al. | |
| 2014/0198729 A1* | 7/2014 | Bostrom | H04W 74/008 370/328 |
| 2015/0141021 A1* | 5/2015 | Kapoulas | H04W 36/32 455/441 |
| 2015/0172985 A1* | 6/2015 | Gangadhar | H04W 28/0861 370/332 |
| 2015/0222345 A1 | 8/2015 | Chapman et al. | |
| 2015/0257118 A1* | 9/2015 | Siomina | H04B 17/21 455/456.1 |
| 2017/0195901 A1 | 7/2017 | Zhou et al. | |
| 2017/0311369 A1* | 10/2017 | Chiba | H04W 76/15 |
| 2020/0059395 A1* | 2/2020 | Chen | H04W 28/082 |
| 2020/0120525 A1* | 4/2020 | da Silva | H04W 36/00835 |
| 2020/0120602 A1* | 4/2020 | Geng | H04W 72/044 |
| 2021/0112465 A1* | 4/2021 | Zhang | H04L 5/001 |
| 2021/0120448 A1* | 4/2021 | Zhang | H04W 76/18 |
| 2021/0282191 A1* | 9/2021 | Chang | H04W 16/18 |
| 2021/0344430 A1* | 11/2021 | Fang | H04B 17/29 |

FOREIGN PATENT DOCUMENTS

| | | |
|---|---|---|
| CN | 101883375 A | 11/2010 |
| CN | 102378380 A | 3/2012 |
| CN | 102572926 A | 7/2012 |
| CN | 102573103 A | 7/2012 |
| CN | 103379558 A | 10/2013 |
| CN | 103561415 A | 2/2014 |
| CN | 108111278 A | 6/2018 |
| CN | 108934019 A | 12/2018 |
| JP | 2016-007073 A | 1/2016 |
| JP | 2016-058965 A | 4/2016 |
| WO | 2017204933 A1 | 11/2017 |
| WO | 2018204863 A1 | 11/2018 |

OTHER PUBLICATIONS

Partial European Search Report for EP Patent Application No. 19914978.2, dated Jun. 29, 2022, 15 pages.

Japanese notice of allowance issued in JP Patent Application No. 2021-547193, dated Sep. 15, 2023, 3 pages. English translation included.

International Preliminary Report on Patentability issued in International Patent Application No. PCT/CN2019/074850, dated Aug. 10, 2021, 6 pages.

International Search Report and Written Opinion mailed on Nov. 12, 2019 for International Application No. PCT/CN2019/074850, filed on Feb. 12, 2019 (9 pages).

Sulaeman et al., "Mobile Application Analysis and Design for Project Performance Reporting," International Conference on ICT for Smart Society, Sep. 3, 2013, 4 pages.

Wang et al., "RADV Method on Performance Measurement Definition," Journal of Beijing University of Posts and Telecommunications, Dec. 30, 2006, vol. 29, No. 6, 4 pages. English abstract included.

Chinese Office Action issued in CN Patent Application No. 201980090043.4, dated May 7, 2022, 28 pages. English translation included.

Japanese Office Action issued in JP Patent Application No. 2021-547193, dated Jan. 5, 2023, 7 pages. English translation included.

Nokia et al., "Use cases for the SON study item, " 3GPP TSG-RAN WG3 Meeting #101bis, R3-185838, Chengdu, P. R. China, Oct. 8-12, 2018, 2 pages.

Chinese Notification to Complete Formalities of Registration in CN Patent Application No. 201980090043.4, dated Jan. 5, 2023, 6 pages. English translation included.

European Search Report issued in EP Patent Application No. 19914978.2, dated Sep. 30, 2022, 14 pages.

European Communication pursuant to Article 94(3) EPC issued in EP Patent Application No. 19914978.2, dated Feb. 16, 2024, 5 pages.

European Communication under Rule 71(3) EPC issued in EP Patent Application No. 19914978.2, dated Sep. 17, 2024, 40 pages.

* cited by examiner

US 12,137,357 B2

1

METHOD OF PERFORMANCE INFORMATION REPORTING

CROSS-REFERENCE TO RELATED APPLICATIONS

This application is a continuation of and claims priority to International Patent Application No. PCT/CN2019/074850, filed on Feb. 12, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to reporting performance information.

In one exemplary aspect, a method for wireless communication is disclosed. The method includes receiving a performance information report from a terminal, wherein the performance information report includes information relating to performance of the network node. The method also includes initiating a performance task based on receiving the performance information report.

In another exemplary aspect, a method for wireless communication includes generating a performance information report that includes information relating to performance of a network node. The method also includes transmitting the performance information report to the network node.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

2

Figure 5:
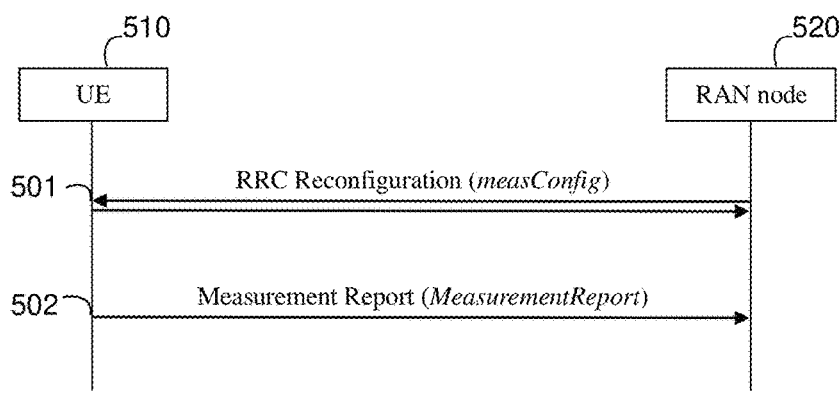

FIG. 5 illustrates a signaling process for an immediate MDT.

Figure 6:
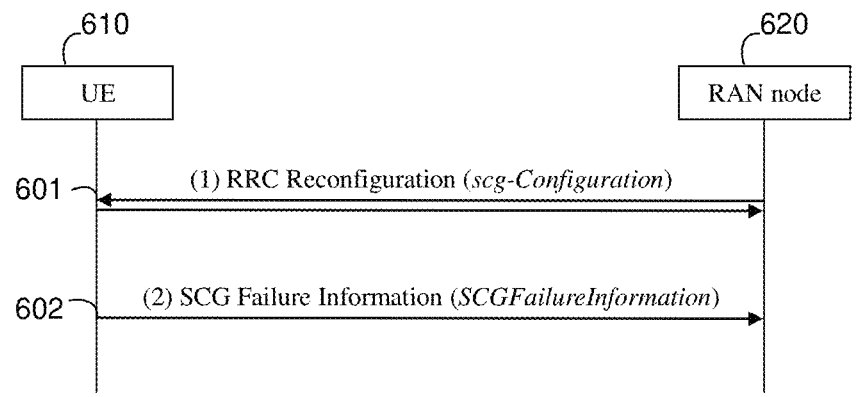

FIG. 6 illustrates a signaling process for a SCG failure report.

Figure 7:
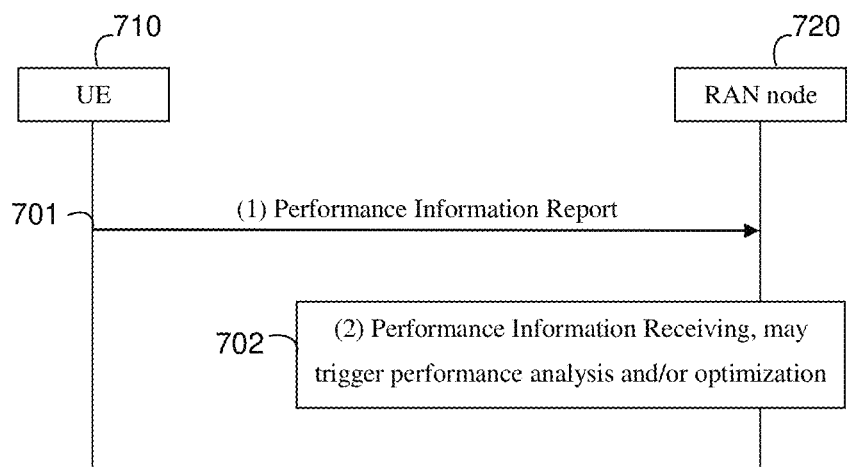

FIG. 7 illustrates a signaling process of a method to report performance information.

Figure 8:
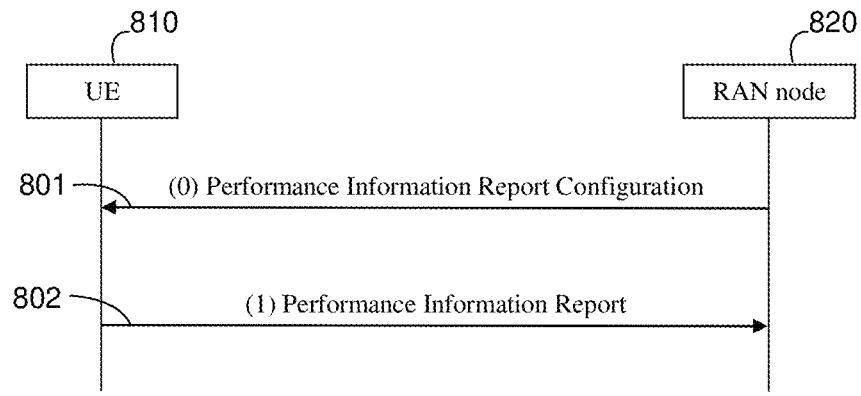

FIG. 8 illustrates a signaling process to indicate a performance information report configuration.

Figure 9:
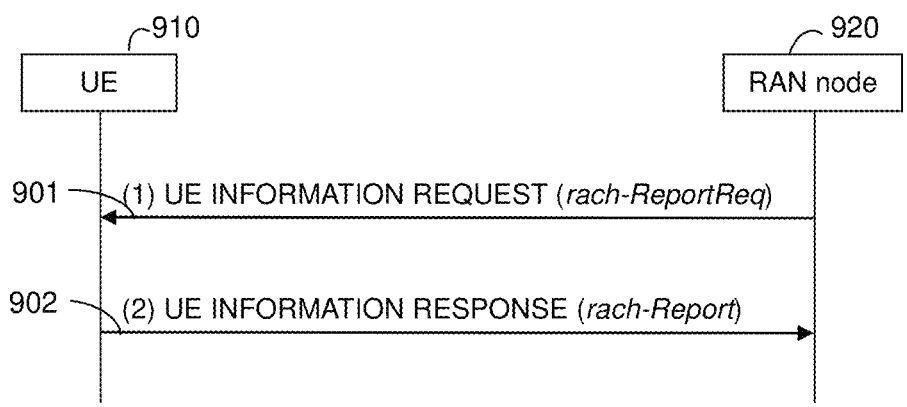

FIG. 9 illustrates a signaling process for requesting a RACH report.

Figure 10:
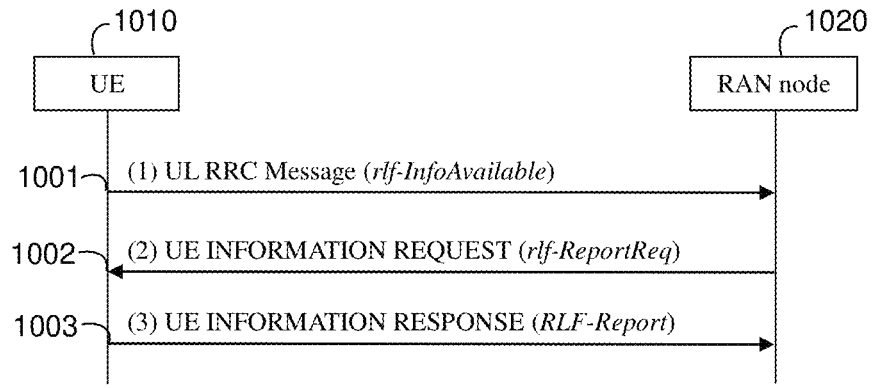

FIG. 10 illustrates a signaling process for requesting a RLF report.

Figure 11:
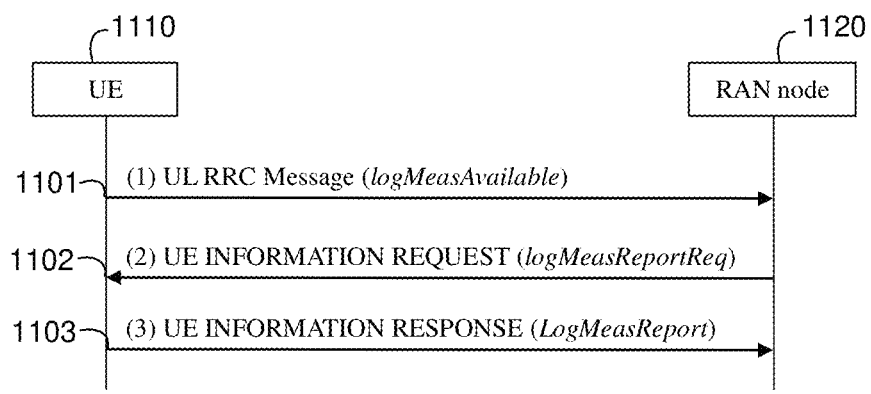

FIG. 11 illustrates a signaling process for requesting a MDT log report.

Figure 12:
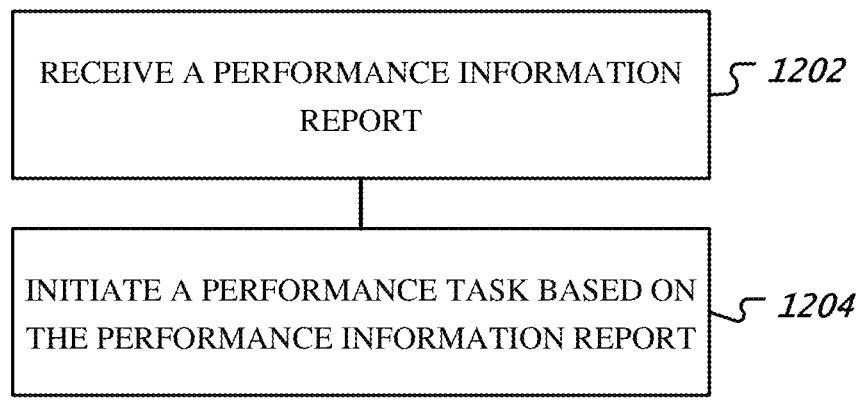

FIG. 12 illustrates a block diagram of a method to report performance information.

Figure 13:
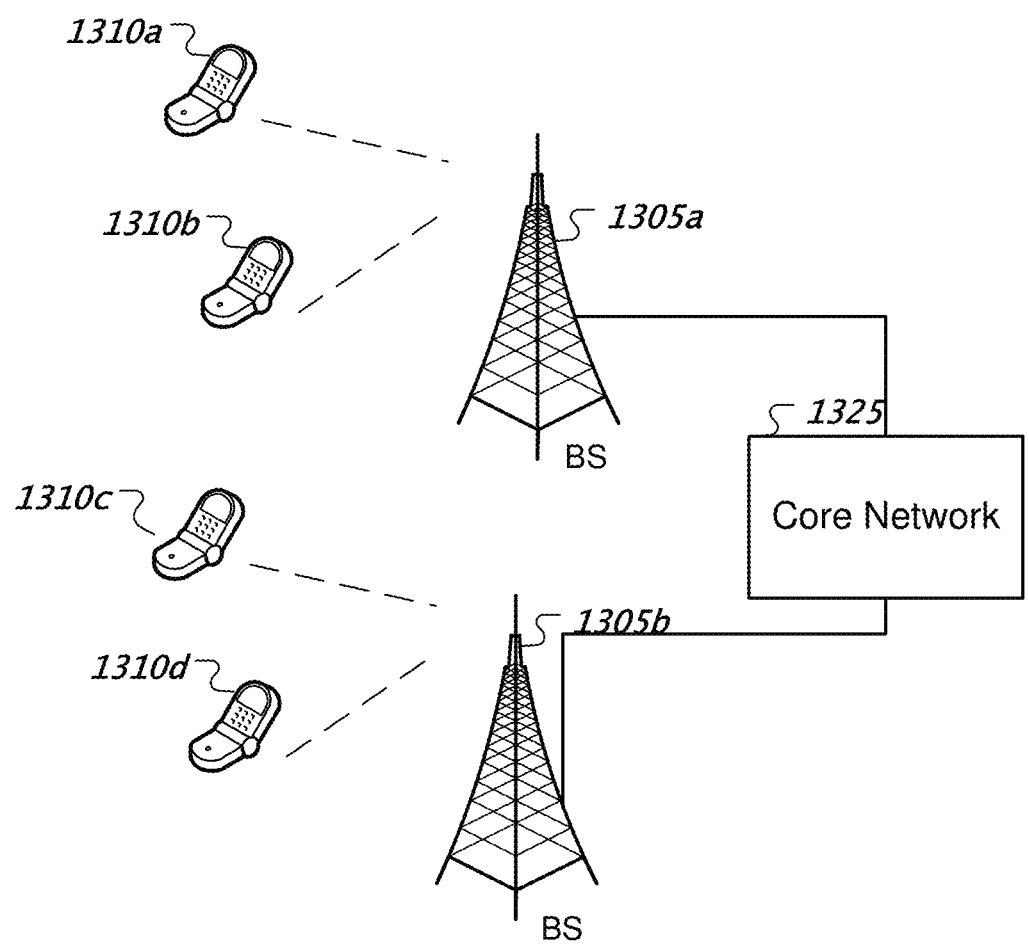

FIG. 13 shows an example of a wireless communication system where techniques in accordance with one or more embodiments of the present technology can be applied.

Figure 14:
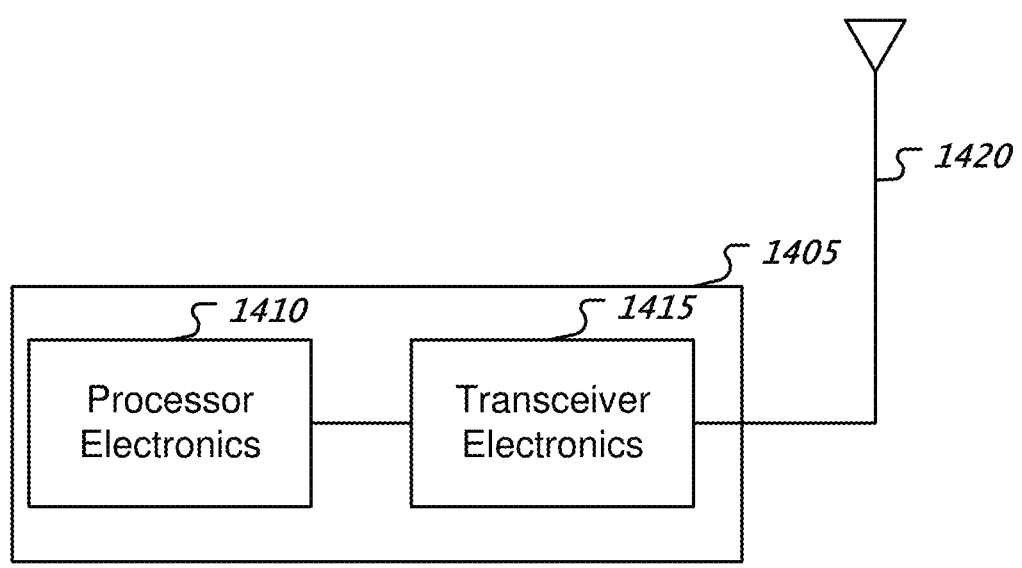

FIG. 14 is a block diagram representation of a portion of a hardware platform.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Figure 1:
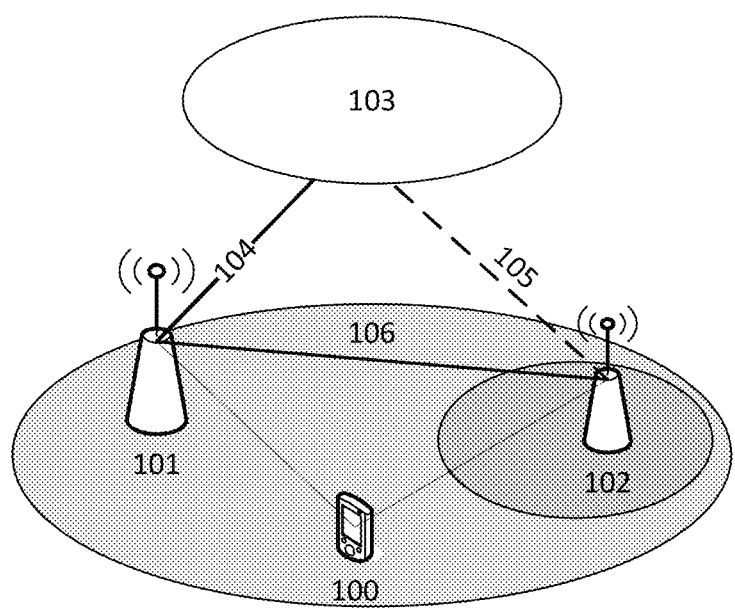
FIG. 1 shows an exemplary schematic diagram of a system architecture for Dual Connectivity (DC).

As NR emerges in the wireless domain, UEs will be capable of supporting both protocols at the same time. FIG. 1 shows an exemplary schematic diagram of a system architecture for Dual Connectivity (DC). The current base station (referred to as the first network element 101) under the core network 103 may select a suitable base station for the UE 100 to function as the second network element 102. For example, the suitable based station can be selected by comparing the channel quality of the base station with a predetermined threshold. Both base stations can provide radio resources to the UE 100 for data transmission on the user plane. On the wired interface side, the first network element 101 and the core network 103 establish a control plane interface 104 for the UE 100. The second network element 102 and the core network 103 may establish a user plane interface 105 for the UE 100. An interface 106 (e.g., Xn interface) inter-connects the two network elements. On the wireless interface side, the first and the second network elements (101 and 102) may provide radio resources using the same or different Radio Access Technologies (RATs). Each of the network element can schedule transmissions with the UE 100 independently. The network element that has a control plane connection to the core network is referred to as the master node (e.g., the first network element 101), and the network element that has only a user plane connection with the core network is referred to as the secondary node (e.g., the second network element 102). In some cases, the UE 100 can be connected to more than two nodes, with one node acting as the primary note and the remaining acting as the secondary nodes.

In some embodiments, a UE can support a LTE-NR dual connection (DC). For example, one of the typical LTE-NR dual connectivity architectures can be set up as follows: the master node is an LTE RAN node (e.g., eNB) and the secondary node is an NR RAN node (e.g., gNB). The eNB and the gNB are simultaneously connected the Evolved Packet Core (EPC) network (e.g., LTE core network). The architecture shown in FIG. 1 can also be modified to include various master/secondary node configurations. For example, a NR RAN node can be the master node and the LTE RAN node can be the secondary node. In such case, the core network for the master NR RAN node is a Next Generation Converged Network (NG-CN).

UE capabilities for the LTE protocol and the NR protocol in LTE-NR DC include two parts: common capabilities of the UE that are applicable to both LTE and NR protocols for single connectivity scenarios, and band combination capabilities of the UE that are relevant for dual connectivity scenarios. When the UE has multiple simultaneous connections with network nodes, the frequency bands used for different network nodes must cooperate with each other regardless of the RAT type(s) used. Here, the term "cooperate" means that the UE can operate in the frequency bands without any conflicts or substantial interference—that is, the frequency bands can co-exist. For example, the 3rd Generation Partnership Project (3GPP) Standards specify a set of band combinations that can cooperate with each other. If frequency band 1 and frequency band 2 are not specified as a valid band combination, the UE cannot use frequency band 1 in communication with node 1 and frequency band 2 in communication with node 2 and the same time.

Figure 2:
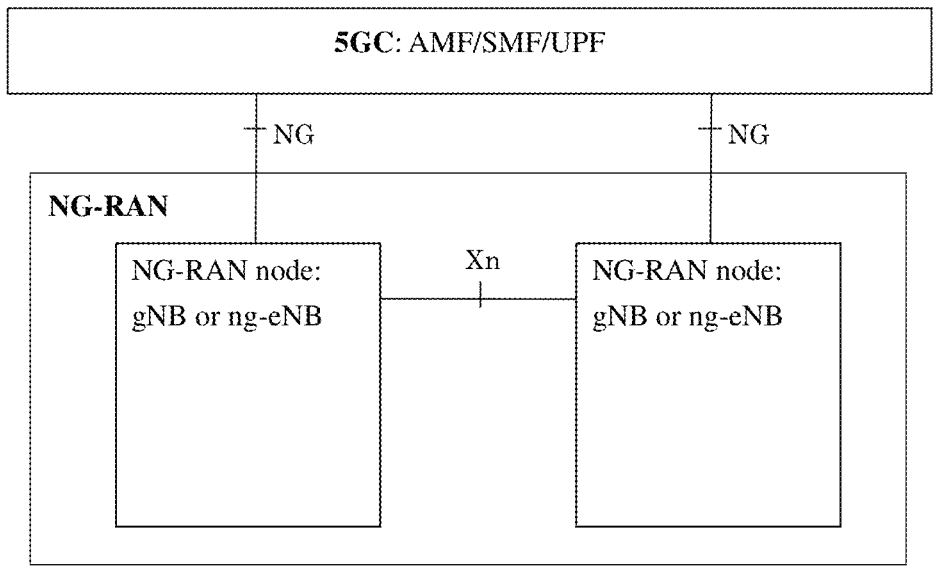
FIG. 2 illustrates an example of the fifth generation (5G) mobile communication system.

This patent document describes techniques that can be implemented to report performance information to a network. FIG. 2 illustrates an example of the fifth generation (5G) mobile communication system 200. The system 200 may include the 5G core network (5GC) and the next generation radio access network (NG-RAN). The 5GC may include a network node such as a access mobility function (AMF), a session management function (SMF), or a user plane function (UPF). The NG-RAN may include two different types of base stations and radio access technologies (RAT), a ng-eNB based on 4G base station (eNB) continue to evolve (the air interface is still 4G RAT, i.e. evolved universal terrestrial radio access (E-UTRA)), and a 5G base station (gNB) based on 5G RAT or NR (New Radio). The NG-RAN base station (gNB or ng-eNB) may be connected to the 5GC through the NG interface including the NG-C control plane connection for signaling transmission and the NG-U user plane connection for data transmission, and the NG-RAN base station may be connected to a peer via the Xn interface including Xn-C control plane connection and Xn-U user plane connection.

Figure 3:
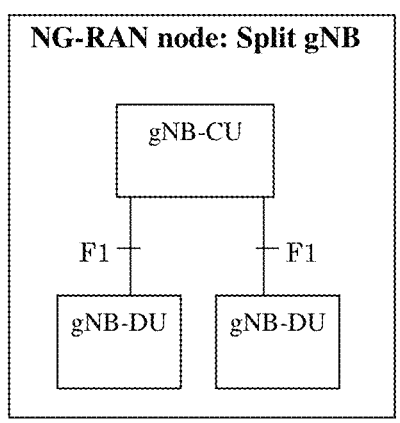
FIG. 3 illustrates an example of a gNB separated into network node entities.

FIG. 3 illustrates an example of a gNB 300 separated into network node entities. The network node entities may include a gNB central unit (gNB-CU) and a plurality of gNB distributed units (gNB-DU) connected by F1 interface. The F1 interface may include a F1-C control plane connection and a F1-U user plane connection. The external interfaces of the gNB after the CU/DU separation may include a NG and Xn interface.

Dual connectivity (DC) may be supported in both 4G and 5G systems. The dual-connected UE can maintain connectivity with two base stations at the same time. One of the base stations is called Master Node (MN), and the other base station is called Secondary Node (SN). There are multiple dual connections of 4G and 5G RAT hybrid networks, such as E-UTRA-NR dual connectivity (EN-DC), in this case the MN is the eNB and the SN is the gNB; the NG-RAN E-UTRA-NR dual connectivity (NGEN-DC), the MN is ng-eNB and the SN is gNB; the NR-E-UTRA dual connectivity (NE-DC), the MN is the gNB and the SN is the ng-eNB; the 5G RAT dual connectivity (NR-DC), the MN and the SN are both gNBs.

To reduce the cost and complexity of manual network testing by mobile network operators using dedicated equipment and personnel, the 4G system has introduced a series of technologies, e.g. minimization of drive tests (MDT), a radio link failure (RLF) Report, a random-access channel (RACH) Report, a secondary cell group (SCG) Failure Report, etc. Through such technologies, the network can obtain useful information from the UE and can further judge the performance of the network's deployment, guide the adjustment and optimization of various functional parameters at the network. For example, it can detect weak coverage and blind spots in some areas of the network and can find hotspot areas with large-capacity communication requirements and unsatisfied quality of service (QoS) for user subscription service.

The MDT technology may use the UE to measure and collect various network performance indicators related to the UE under the configuration guidance of the network. Then, the UE may report the performance indicators to the base station (e.g. eNB) through air interface signaling. The base station may report to the trace collection entity (TCE). The MDT can be classified into logged MDT and immediate MDT. The logged MDT refers to the execution of a MDT measurement task by the UE in the idle state RRC_IDLE or inactive state RRC_INACTIVE state according to the MDT related parameter configuration such as the valid range of logged MDT, recording interval and recording duration received in the connected state, and recording the measurement results as the MDT log. When the UE returns to the connected state, the UE may transmit an indication of log measurement available to the base station through a suitable RRC uplink message. If necessary, the base station may acquire the MDT log information from the UE at an appropriate time. The immediate MDT may refer to the measurement immediately after the UE receives the MDT related parameter configuration in the connected state RRC_CONNECTED, that is, the measurement may also be performed in the connected state, and immediately reports the measurement result and the UE may not store the measurement result. The measurements of the immediate MDT associated with the UE may include the downlink pilot strength (reference signal receiving power (RSRP) and reference signal receiving quality (RSRQ)), the UE's transmit power headroom (PHR), and the uplink PDCP packet delay. The logged MDT related measurement configured for the UE may include the downlink pilot strength (RSRP and RSRQ).

The RLF Report technology enables the network to obtain the Radio Link Failure (RLF) related information from the UE. The RLF related information may include an identifier of the last cell that served the UE in case of RLF, the identifier of the handover target in case of handover failure, the RSRP and RSRQ of the last served cell, a RLF cause (such as the random access problem, a maximum number of RLC re-transmissions has been reached, etc.

The RACH Report technology may allow for the network to obtain the Random-Access Channel (RACH) related information from the UE. The RACH related information may include a number of preambles sent by MAC for the last successfully completed random access procedure.

The SCG Failure Report technology may allow for the network to obtain the Secondary Cell Group (SCG) Failure related information from the UE. The SCG failure information may include a SCG radio link failure information, a SCG change failure information.

Figure 4:
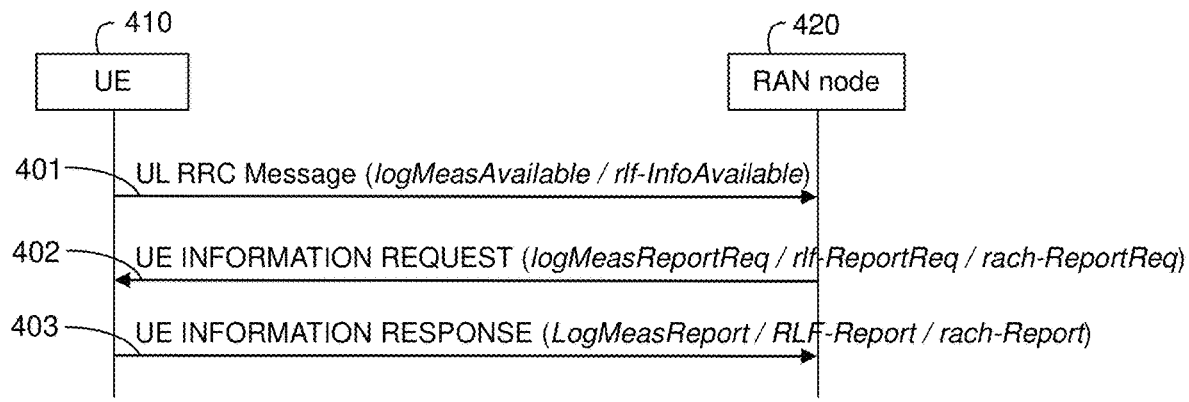
FIG. 4 illustrates a signaling process of a logged MDT or RLF report.

FIG. 4 illustrates a signaling process of a logged MDT or RLF report. For a logged MDT or RLF Report, as shown in step 401 of FIG. 4, the UE may send an indication of log measurement available or RLF information available to the base station to indicate that there is available MDT Log or RLF Information in the UE. The indication may be sent through a suitable RRC uplink message such as RRCConnectionSetupComplete. The base station may acquire the MDT log report information or the RLF report information from the UE when necessary, by sending the UE INFORMATION REQUEST message to the UE (step 402). In response, the UE may the MDT Log Report information or RLF Report information through the UE INFORMATION RESPONSE message to the RAN node (step 403).

For the RACH Report, as shown in FIG. 4, the RAN node can acquire the RACH Report information from the UE when necessary, after the UE has successfully completed the random-access procedure.

FIG. 5 illustrates a signaling process for an immediate MDT. The UE and a RAN node may communicate via a RRC configuration, such as measConfig (step 501). For the immediate MDT, as shown in FIG. 5, the UE may send measurement results of immediate MDT to the RAN node (step 502). The measurement results may be sent via a Measurement Report message, after the UE has received the measurement configuration of immediate MDT in the RRC Reconfiguration message.

FIG. 6 illustrates a signaling process for a SCG failure report. The UE may receive a RRC reconfiguration message, such as a scg-configuration, from a RAN node (step 601). For the SCG Failure Report, as shown in FIG. 6, the UE may send the SCG failure information to the RAN node via the SCG Failure Information message after the UE has received the SCG configuration in the RRC Reconfiguration message (step 602).

FIG. 7 illustrates a signaling process of a method to report performance information.

As shown in Step 701 of FIG. 7, the UE may report performance information to the RAN node. In step 702, the RAN node may receive the performance information and may trigger a network performance analysis based on the received performance information. For example, a network performance analysis may include counting a number of times that were reported from multiple UEs relating to a problem reported in the received performance information. In this example, the network performance analysis may determine whether the number of times exceeds a predetermined threshold value. The RAN node may trigger the network performance optimization, if necessary. As an example, network performance optimization may include adjusting relative radio parameters of the RAN node based on the result of network performance analysis.

In some embodiments, the performance information includes UE location information where the SCG failure happens.

In some embodiments, the performance information includes SSB frequency information of the associated SSB in the previous Cell (e.g. the last Cell or PCell that served the UE in case of RLF, the handover target Cell or PCell in case of handover failure), the SSB frequency information includes one or more of the following: SSB frequency, SSB subcarrier spacing.

In some embodiments, the performance information includes Beam level measurement results of the serving Cell (or PCell) and/or the neighbor Cell (or PCell), the beam level measurement results includes the SSB based measurement results and/or the CSI-RS based measurement results, each beam level measurement result includes the beam index and at least one of the following: SSB RSRP, SSB RSRQ, SSB SINR, CSI-RS RSRP, CSI-RS RSRQ, CSI-RS SINR.

In some embodiments, the performance information includes Beam related RACH information, includes one or more of the following: a list of beam indexes of the beams on which the UE has attempted the RACH procedure, the number of preambles sent for each beam on which the UE has attempted the RACH procedure, the beam type (e.g. SSB or CSI-RS) for each beam on which the UE has attempted the RACH procedure.

In some embodiments, the performance information includes BWP information of the previous Cell (e.g. the last Cell or PCell that served the UE in case of RLF, the handover target Cell or PCell in case of handover failure), includes one or more of the following: BWP ID of the last active BWP in the previous Cell when failure happens, BWP IDs of all configured BWPs in the previous Cell, BWP frequency domain configuration (e.g. position, bandwidth) of the last active BWP in the previous Cell when failure happens, BWP frequency domain configuration (e.g. position, bandwidth) of all configured BWPs in the previous Cell.

In some embodiments, the performance information includes Handover related information, includes one or more of the following: Handover type indication (e.g. CHO, MBB, eMBB, RACH less handover, DC based handover, normal handover), Time elapsed from CHO command reception to handover execution, Candidate cell list included in the CHO command, Triggered event included in the CHO command.

In some embodiments, the performance information includes The RLF monitoring related beam resource information of the failure Cell (or PCell), includes one or more of the following: the resource information of SSB beam which configured for RLF monitoring (e.g. beam index), the resource information of CSI-RS beam which configured for RLF monitoring (e.g. CSI-RS resource ID, CSI-RS time/frequency domain resource configuration).

In some embodiments, the performance information includes an Indication to differentiate the RACH failure caused by beam failure recovery from other cases, includes one of the following: an explicit value in the RLF cause field, an extra explicit indication apart from the RLF cause field.

In some embodiments, the performance information includes Service information of the failure Cell (or PCell) or failure beam, includes one of the following: a list of QCIs or 5QIs, a economic way to indicate a list of QCIs or 5QIs (e.g. a bitmap).

In some embodiments, the performance information includes Supplemental Uplink (SUL) information, includes one or more of the following: an indication to indicate whether the failure is occurred in SUL carrier or normal UL carrier, an indication to indicate whether the UL PRB usage is for SUL carrier or normal UL carrier.

In some embodiments, the performance information includes New Radio Unlicensed (NR-U) information, includes one or more of the following: an indication to indicate whether the failure is occurred in NR unlicensed carrier or NR licensed carrier, an indication to indicate whether the UL PRB usage is for NR unlicensed carrier or NR licensed carrier.

FIG. 8 illustrates a signaling process to indicate a performance information report configuration. As shown in Step 801 of FIG. 8, the RAN node may send a performance information report configuration to the UE to indicate the UE what to report. The performance information report configuration may be transmitted through a RRC Reconfiguration message.

In some embodiments, the performance information report configuration may include an indication to report the UE location information where the SCG failure happens.

In some embodiments, the performance information report configuration may include an indication to report the SSB frequency information of the associated SSB in the previous Cell.

In some embodiments, the performance information report configuration may include an indication to report the beam level measurement results of the serving Cell and/or the neighbor Cell.

In some embodiments, the performance information report configuration may include an indication to report the beam related RACH information.

In some embodiments, the performance information report configuration may include an indication to report the BWP information of the previous Cell.

In some embodiments, the performance information report configuration may include an indication to report the handover related information.

In some embodiments, the performance information report configuration may include an indication to report the RLF monitoring related beam resource information of the failure Cell.

In some embodiments, the performance information report configuration may include an indication to report the indication to differentiate the RACH failure caused by beam failure recovery from other cases.

In some embodiments, the performance information report configuration may include an indication to report the service information of the failure Cell or failure beam.

In some embodiments, the performance information report configuration may include an indication to report the SUL information.

In some embodiments, the performance information report configuration may include an indication to report the NR-U information.

As shown in FIG. 4, the performance information may be carried in a UE INFORMATION RESPONSE message (step 403) from the UE to the RAN node. The UE INFORMATION RESPONSE message may be included in the RLF Report, e.g. for the SSB frequency information of the associated SSB in the previous Cell, the BWP information of the previous Cell, the handover related information, the RLF monitoring related beam resource information of the failure Cell, the indication to differentiate the RACH failure caused by beam failure recovery from other cases, the service information of the failure Cell or failure beam, the SUL information, the NR-U information; or included in the RACH Report, e.g. for the beam related RACH information; or included in the MDT Log Report, e.g. for the beam level measurement results of the serving Cell and/or the neighbor Cell.

As shown in FIG. 6, the performance information may be included in the SCG Failure Information message (step 602), sent from the UE to the RAN node, e.g. for the UE location information where the SCG failure happens.

As shown in FIG. 3, the performance information may be sent from the DU to the CU via the F1 interface, carried in the F1AP message such as the UL RRC MESSAGE TRANSFER message or a new message, after the DU receiving it from the UE. The performance information report configuration may be sent from the CU to the DU via the F1 interface, carried in the F1AP message such as the DL RRC MESSAGE TRANSFER message or an new message. The DU may send an indication of MDT Log Report available or RLF Report available to the CU via the F1 interface, carried in the F1AP message such as the UL RRC MESSAGE TRANSFER message or a new message. The CU may send an indication of MDT Log Report request or RLF Report request or RACH Report request to the DU via the F1 interface, carried in the F1AP message such as the DL RRC MESSAGE TRANSFER message or a new message.

Example Embodiment 1

FIG. 9 illustrates a signaling process for requesting a RACH report. As shown in Step 901 of FIG. 9, the RAN node may send a UE INFORMATION REQUEST message to the UE. The UE INFORMATION REQUEST message may include the indication of RACH report request to request the reporting of a RACH report.

In Step 902, the UE may send a UE INFORMATION RESPONSE message to the RAN node. The UE INFORMATION RESPONSE message may include the RACH report. The RACH report may include at least one of the beam related RACH information which including one or more of the following: a list of beam indexes of the beams on which the UE has attempted the RACH procedure, the number of preambles sent for each beam on which the UE has attempted the RACH procedure, and the beam type (e.g. SSB or CSI-RS) for each beam on which the UE has attempted the RACH procedure.

Example Embodiment 2

FIG. 10 illustrates a signaling process for requesting a RLF report. In Step 1001 of FIG. 10, the UE may send a suitable RRC uplink message, such as the RRCConnectionSetupComplete message, to the RAN node. The RRC uplink message may include an indication that a RLF Report is available.

In Step 1002, the RAN node may send the UE INFORMATION REQUEST message to the UE. The UE INFORMATION REQUEST message may include a request for the RLF report.

In Step 1003, the UE may send a UE INFORMATION RESPONSE message to the RAN node. The UE INFORMATION RESPONSE message may include the RLF report. The RLF report may include at least one of SSB frequency information of the associated SSB in the previous Cell (e.g. the last Cell or PCell that served the UE in case of RLF, the handover target Cell or PCell in case of handover failure), a SSB frequency information including at least one of SSB frequency and SSB subcarrier spacing.

Example Embodiment 3

FIG. 11 illustrates a signaling process for requesting a MDT log report. In Step 1101 of FIG. 11, the UE may send a RRC uplink message, such as a RRCConnectionSetupComplete message, to the RAN node. The RRC uplink message may include an indication that a MDT Log Report is available.

In Step 1102, the RAN node may send the UE INFORMATION REQUEST message to the UE. The UE INFORMATION REQUEST message may include a request for a MDT Log report.

In Step 1103, the UE may send a UE INFORMATION RESPONSE message to the RAN node. The UE INFOR- MATION RESPONSE message may include the MDT Log report. The MDT Log report may include a beam level measurement results of the serving Cell (or PCell) and/or the neighbor Cell (or PCell), beam level measurement results including the SSB based measurement results and/or the CSI-RS based measurement results, where each beam level measurement result includes the beam index and at least one of the following: SSB RSRP, SSB RSRQ, SSB SINR, CSI-RS RSRP, CSI-RS RSRQ, CSI-RS SINR.

Example Embodiment 4

As shown in Step 601 of FIG. 6, the RAN node may send a RRC Reconfiguration message to the UE that includes a SCG configuration information. Based on the RRC configuration message, the UE may enter into a DC mode.

In Step 602, based on a SCG failure, the UE may send a SCG Failure Information message to the RAN node. The SCG Failure Information message may include SCG failure information including a UE location information where the SCG failure occurred.

FIG. 12 illustrates a block diagram of a method to report performance information. A network node may receive a performance information report from a terminal, wherein the performance information report includes information relating to performance of the network node (block 1202). The network node may initiate a performance task based on receiving the performance information report (block 1204).

In some embodiments, initiating the performance task includes at least one of a network performance analysis and a network performance optimization.

In some embodiments, initiating the performance task includes forwarding the performance information report to a second network node, wherein the second network node is configured to perform at least one of a network performance analysis and a network performance optimization.

In some embodiments, the method includes transmitting, by the network node, a terminal information request message to the terminal, wherein the terminal information request message includes a request for a random-access channel (RACH) report.

In some embodiments, the performance information report transmitted by the terminal includes the RACH report based on the terminal information request message.

In some embodiments, the method includes receiving, by the network node, a radio resource control (RRC) uplink message from the terminal indicating that a radio link failure (RLF) report is available.

In some embodiments, the method includes transmitting, by the network node, a terminal information request message from the terminal including a request for the RLF report based on receiving the RRC uplink message.

In some embodiments, the performance information report transmitted by the terminal includes the RLF report based on the terminal information request message.

In some embodiments, the method includes receiving, by the network node, a RRC uplink message from the terminal indicating that a minimization of drive test (MDT) log report is available.

In some embodiments, the method includes transmitting, by the network node, a terminal information request message from the terminal including a request for the MDT log report based on receiving the RRC uplink message.

In some embodiments, the performance report transmitted by the terminal includes the MDT log report based on the terminal information request message.

In some embodiments, the method includes transmitting, by the network node, a RRC configuration message to the terminal, wherein the RRC configuration message includes a secondary cell group (SCG) configuration, and wherein the terminal is configured to operate in a dual-connectivity (DC) mode upon receipt of the RRC configuration message.

In some embodiments, the performance information report transmitted by the terminal includes a SCG failure information message indicating a SCG failure at the terminal based on the RRC configuration message.

In another exemplary embodiment, a method for wireless communication is disclosed. The method may include generating, by a terminal, a performance information report that includes information relating to performance of a network node. The method may also include transmitting, by the terminal, the performance information report to the network node.

In some embodiments, the network node is configured to initiate a network performance task, wherein the network performance task includes at least one of initiating a network performance analysis, initiating a network performance optimization, and forwarding the performance information report to a second network node.

In some embodiments, the method includes receiving, by the terminal, a terminal information request message from the network node, wherein the terminal information request message includes a request for a random-access channel (RACH) report.

In some embodiments, the performance information report includes the RACH report based receiving the terminal information request message transmitted from the network node.

In some embodiments, the method includes transmitting, by the terminal, a radio resource control (RRC) uplink message to the network node indicating that a radio link failure (RLF) report is available.

In some embodiments, the method includes receiving, by the terminal, a terminal information request message from the network node including a request for the RLF report.

In some embodiments, the performance information report transmitted by the terminal includes the RLF report based on receiving the terminal information request message from the network node.

In some embodiments, the method includes transmitting, by the terminal, a RRC uplink message to the network node indicating that a minimization of drive test (MDT) log report is available.

In some embodiments, the method includes receiving, by the terminal, a terminal information request message from the network node including a request for the MDT log report.

In some embodiments, the performance information report transmitted by the terminal includes the MDT log report based on receiving the terminal information request message from the network node.

In some embodiments, the method includes receiving, by the terminal, a RRC configuration message from the network node, wherein the RRC configuration message includes a secondary cell group (SCG) configuration, and wherein the terminal is configured to operate in a dual-connectivity (DC) mode upon receipt of the RRC configuration message.

In some embodiments, the performance information report transmitted by the terminal includes a SCG failure indication indicating that a SCG failure occurred at the terminal.

In some embodiments, the performance information report includes terminal location information indicating a location of a secondary cell group (SCG) failure.

In some embodiments, one of the RLF report and the performance information report includes a synchronization signal block (SSB) frequency information of a SSB in a previous cell.

In some embodiments, the SSB frequency information includes at least one of a SSB frequency and a SSB subcarrier spacing.

In some embodiments, one of the MDT log report and the performance information report includes beam level measurement results of at least one of a serving cell and a neighbor cell.

In some embodiments, the beam level measurement results include at least one of SSB-based results and channel state information reference signal (CSI-RS) based results.

In some embodiments, the beam level measurement results include at least one of a beam index, a SSB reference signal receiving power (RSRP), SSB reference signal receiving quality (RSRQ), SSB signal to interference plus noise ratio (SINR), CSI-RS RSRP, CSI-RS RSRQ, CSI-RS SINR.

In some embodiments, one of the RACH report and the performance information report includes beam related RACH information.

In some embodiments, the beam related RACH information includes at least one of a list of beam indexes associated with beams that the terminal has attempted a RACH procedure, a number of preambles sent for each beam that the terminal has attempted the RACH procedure, and a SSB or CSI-RS beam type for each beam that the terminal has attempted the RACH procedure.

In some embodiments, one of the RLF report and the performance information report includes bandwidth part (BWP) information of a previous cell.

In some embodiments, the previous cell includes one of a cell that served the terminal and experienced a RLF failure, and a handover target cell that experienced a handover failure.

In some embodiments, the BWP information includes at least one of a BWP identifier of a last active BWP in the previous cell that occurred a failure, a BWP identifier of each configured BWP in the previous cell, a BWP frequency domain configuration of the last active BWP, a BWP frequency domain configuration of each configured BWP in the previous cell.

In some embodiments, one of the RLF report and the performance information report includes handover information that includes at least one of a handover type indication, a time elapsed from a conditional handover (CHO) command reception to a handover execution, a candidate cell list included in the CHO command, a triggered event included in the CHO command.

In some embodiments, one of the RLF report and the performance information report includes a RLF monitoring beam resource information that includes at least one of a resource information of a SSB beam configured for RLF monitoring, a resource configuration for a CSI-RS beam configured for RLF monitoring.

In some embodiments, one of the RLF report and the performance information report includes an indication to differentiate a RACH failure caused by a beam failure recovery that includes at least one of an explicit value in a RLF cause field and an extra explicit indication apart from the RLF cause field.

In some embodiments, the performance information report includes service information of a cell or a beam that experienced a failure, wherein the service information includes at least one of a list of 5G QoS identifiers (5QIs), a 5QI bitmap, a list of QoS class identifiers (QCIs) and a QCI bitmap.

In some embodiments, one of the RLF report and the performance information report includes a supplemental uplink (SUL) information that includes at least one of an indication that a failure occurred in a SUL carrier or a UL carrier, an indication that an uplink physical resource block (PRB) usage is for the SUL carrier or the UL carrier.

In some embodiments, one of the RLF report and the performance information report includes new radio unlicensed (NR-U) information that includes at least one of an indication that a failure occurred in a NR unlicensed carrier or a NR licensed carrier, and an indication that an uplink PRB usage is for the NR unlicensed carrier or the NR licensed carrier.

In some embodiments, the method includes transmitting a performance information configuration message from the network node to the terminal.

In some embodiments, the performance information configuration message includes at least one of an indicator of whether to report UE location information where a SCG failure occurs, an indicator of whether to report a SSB frequency information of a SSB in a previous cell, an indicator to report a beam level measurement result of a serving cell or a neighbor cell, an indicator to report a beam related RACH information, an indicator to report BWP information of the previous cell, an indicator to report handover related information, an indicator to report RLF monitoring related beam resource information of a failed cell, an indicator to report an indication to differentiate a RACH failure, an indicator to report service information of the failed cell or a failed beam, an indicator to report SUL information, and an indicator to report NR-U information.

In some embodiments, the performance information report is transmitted from a distributed unit (DU) to a centralized unit (CU) via an F1 interface.

FIG. 13 shows an example of a wireless communication system where techniques in accordance with one or more embodiments of the present technology can be applied. A wireless communication system 1300 can include one or more base stations (BS s) 1305a, 1305b, one or more wireless devices 1310a, 1310b, 1310c, 1310d, and a core network 1325. A base station 1305a, 1305b can provide wireless service to wireless devices 1310a, 1310b, 1310c and 1310d in one or more wireless sectors. In some implementations, a base station 1305a, 1305b includes directional antennas to produce two or more directional beams to provide wireless coverage in different sectors.

The core network 1325 can communicate with one or more base stations 1305a, 1305b. The core network 1325 provides connectivity with other wireless communication systems and wired communication systems. The core network may include one or more service subscription databases to store information related to the subscribed wireless devices 1310a, 1310b, 1310c, and 1310d. A first base station 1305a can provide wireless service based on a first radio access technology, whereas a second base station 1305b can provide wireless service based on a second radio access technology. The base stations 1305a and 1305b may be co-located or may be separately installed in the field according to the deployment scenario. The wireless devices 1310a, 1310b, 1310c, and 1310d can support multiple different radio access technologies.

In some implementations, a wireless communication system can include multiple networks using different wireless technologies. A dual-mode or multi-mode wireless device includes two or more wireless technologies that could be used to connect to different wireless networks.

FIG. 14 is a block diagram representation of a portion of a hardware platform. A hardware platform 1405 such as a network device or a base station or a wireless device (or UE) can include processor electronics 1410 such as a microprocessor that implements one or more of the techniques presented in this document. The hardware platform 1405 can include transceiver electronics 1415 to send and/or receive wired or wireless signals over one or more communication interfaces such as antenna 1420 or a wireline interface. The hardware platform 1405 can implement other communication interfaces with defined protocols for transmitting and receiving data. The hardware platform 1405 can include one or more memories (not explicitly shown) configured to store information such as data and/or instructions. In some implementations, the processor electronics 1410 can include at least a portion of the transceiver electronics 1415. In some embodiments, at least some of the disclosed techniques, modules or functions are implemented using the hardware platform 1405.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
transmitting, by a network node to a terminal, a terminal information request message or a radio resource control (RRC) configuration message;
receiving, by the network node, a performance information report from the terminal, wherein the performance information report includes information relating to performance of the network node; and
initiating, by the network node, a performance task based on the performance information report,
wherein the terminal information request message includes a request for a random-access channel (RACH) report,
wherein the performance information report includes the RACH report based on the terminal information request message, and wherein the RACH report includes at least one of: a list of beam indexes associated with beams that the terminal has attempted a RACH procedure, a number of preambles sent for each beam that the terminal has attempted the RACH procedure, or a synchronization signal block (SSB) or channel state information reference signal (CSI-RS) beam type for each beam that the terminal has attempted the RACH procedure,
wherein the RRC configuration message includes a secondary cell group (SCG) configuration and causes the terminal to operate in a dual connectivity (DC) mode upon a receipt of the RRC configuration message, and
wherein the performance information report further includes a SCG failure information message indicating a SCG failure at the terminal.

2. The method of claim 1, further comprising:
receiving, by the network node, a radio resource control (RRC) uplink message from the terminal indicating that a radio link failure (RLF) report is available,
wherein the terminal information request message includes a request for the RLF report based on receiving the RRC uplink message,
wherein the performance information report transmitted by the terminal includes the RLF report based on the terminal information request message.

3. The method of claim 2, wherein the RLF report includes:
(1) a synchronization signal block (SSB) frequency, an SSB subcarrier spacing of an SSB of a previous cell, or bandwidth part (BWP) information of the previous cell, wherein the previous cell is: a cell that served the terminal and experienced a RLF failure or a handover target cell that experienced a handover failure, and wherein the BWP information includes at least one of: a BWP identifier of a last active BWP in the previous cell that occurred a failure, a BWP identifier of each configured BWP in the previous cell, a BWP frequency domain configuration of the last active BWP, or a BWP frequency domain configuration of each configured BWP in the previous cell;
(2) handover information that includes at least one of:
a handover type indication, a time elapsed from a conditional handover (CHO) command reception to a handover execution, a candidate cell list included in the CHO command, or a triggered event included in the CHO command;
RLF monitoring beam resource information that includes at least one of: a resource information of a SSB beam configured for RLF monitoring, or a resource configuration for a channel state information reference signal (CSI-RS) beam configured for RLF monitoring;
or an indication to differentiate a RACH failure caused by a beam failure recovery that includes at least one of: an explicit value in a RLF cause field or an explicit indication apart from the RLF cause field;
(3) supplemental uplink (SUL) information that includes at least one of: an indication that a failure occurred in a SUL carrier or a UL carrier; or an indication that an uplink physical resource block (PRB) usage is for the SUL carrier or the UL carrier; or
(4) new radio unlicensed (NR-U) information that includes at least one of: an indication that a failure occurred in a NR unlicensed carrier or a NR licensed carrier; or an indication that an uplink PRB usage is for the NR unlicensed carrier or the NR licensed carrier.

4. The method of claim 1, further comprising:
receiving, by the network node, a radio resource control (RRC) uplink message from the terminal indicating that a minimization of drive test (MDT) log report is available,
wherein the terminal information request message includes a request for the MDT log report based on receiving the RRC uplink message,
wherein the performance report transmitted by the terminal includes the MDT log report based on the terminal information request message, and
wherein the MDT log report includes a beam level measurement result of a serving cell or a neighbor cell, the beam level measurement result including at least one of: a beam index, a SSB reference signal receiving power (RSRP), synchronization signal block (SSB) reference signal receiving quality (RSRQ), SSB signal to interference plus noise ratio (SINR), channel state information reference signal (CSI-RS) RSRP, CSI-RS RSRQ, or CSI-RS SINR.

5. A method of wireless communication, comprising:
receiving, by a terminal from a network node, a terminal information request message including or a radio resource control (RRC) configuration message;
generating, by the terminal, a performance information report that includes information relating to performance of the network node; and
transmitting, by the terminal, the performance information report to the network node,
wherein the terminal information request message includes a request for a random-access channel (RACH) report,
wherein the performance information report includes the RACH report based on receiving the terminal information request message transmitted from the network node, and wherein the RACH report includes at least one of: a list of beam indexes associated with beams with which the terminal has attempted a RACH procedure, a number of preambles sent for each beam with which the terminal has attempted the RACH procedure, or a synchronization signal block (SSB) or channel state information reference signal (CSI-RS) beam type for each beam with which the terminal has attempted the RACH procedure,
wherein the RRC configuration message includes a secondary cell group (SCG) configuration and causes the terminal to operate in a dual connectivity (DC) mode upon a receipt of the RRC configuration message, and wherein the performance information report further
includes a SCG failure indication indicating that a SCG
failure occurred at the terminal.

6. The method of claim 5, further comprising:
transmitting, by the terminal, a radio resource control
(RRC) uplink message to the network node indicating
that a radio link failure (RLF) report is available,
wherein the terminal information request message
includes a request for the RLF report,
wherein the performance information report transmitted
by the terminal includes the RLF report based on
receiving the terminal information request message
from the network node.

7. The method of claim 6, wherein the RLF report includes:
(1) a synchronization signal block (SSB) frequency, an
SSB subcarrier spacing of an SSB of a previous cell, or
bandwidth part (BWP) information of the previous cell,
wherein the previous cell is: a cell that served the
terminal and experienced a RLF failure, or a handover
target cell that experienced a handover failure, and
wherein the BWP information includes at least one of:
a BWP identifier of a last active BWP in the previous
cell that occurred a failure, a BWP identifier of each
configured BWP in the previous cell, a BWP frequency
domain configuration of the last active BWP, or a BWP
frequency domain configuration of each configured
BWP in the previous cell;
(2) handover information that includes at least one of:
a handover type indication, a time elapsed from a
conditional handover (CHO) command reception to
a handover execution, a candidate cell list included
in the CHO command, or a triggered event included
in the CHO command;
RLF monitoring beam resource information that
includes at least one of: a resource information of a
SSB beam configured for RLF monitoring, or a
resource configuration for a channel state information reference signal (CSI-RS) beam configured for
RLF monitoring;
or an indication to differentiate a RACH failure caused
by a beam failure recovery that includes at least one
of: an explicit value in a RLF cause field or an
explicit indication apart from the RLF cause field;
(3) supplemental uplink (SUL) information that includes
at least one of: an indication that a failure occurred in
a SUL carrier or a UL carrier; or an indication that an
uplink physical resource block (PRB) usage is for the
SUL carrier or the UL carrier; or
(4) new radio unlicensed (NR-U) information that
includes at least one of: an indication that a failure
occurred in a NR unlicensed carrier or a NR licensed
carrier; or an indication that an uplink PRB usage is for
the NR unlicensed carrier or the NR licensed carrier.

8. The method of claim 5, further comprising:
transmitting, by the terminal, a radio resource control
(RRC) uplink message to the network node indicating
that a minimization of drive test (MDT) log report is
available,
wherein the terminal information request message
includes a request for the MDT log report,
wherein the performance information report transmitted
by the terminal includes the MDT log report based on
receiving the terminal information request message
from the network node, and
wherein the MDT log report includes a beam level measurement result of a serving cell or a neighbor cell, the
beam level measurement result including at least one
of: a beam index, a synchronization signal block (SSB)
reference signal receiving power (RSRP), SSB reference signal receiving quality (RSRQ), SSB signal to
interference plus noise ratio (SINR), channel state
information reference signal (CSI-RS) RSRP, CSI-RS
RSRQ, or CSI-RS SINR.

9. An apparatus for wireless communication comprising a
processor and a memory storing instructions, execution of
which by the processor causes the apparatus to:
transmit, to a terminal, a terminal information request
message or a radio resource control (RRC) configuration message;
receive, a performance information report from the terminal, wherein the performance information report
includes information relating to performance of the
apparatus; and
initiate, a performance task based on the performance
information report,
wherein the terminal information request message
includes a request for a random-access channel
(RACH) report,
wherein the performance information report includes the
RACH report based on the terminal information request
message, and wherein the RACH report includes at
least one of: a list of beam indexes associated with
beams that the terminal has attempted a RACH procedure, a number of preambles sent for each beam that the
terminal has attempted the RACH procedure, or a
synchronization signal block (SSB) or channel state
information reference signal (CSI-RS) beam type for
each beam that the terminal has attempted the RACH
procedure, and
wherein the RRC configuration message includes a secondary cell group (SCG) configuration and causes the
terminal to operate in a dual connectivity (DC) mode
upon a receipt of the RRC configuration message, and
wherein the performance information report includes a
SCG failure information message indicating a SCG
failure at the terminal.

10. The apparatus of claim 9, wherein the apparatus is
further caused to:
receive a radio resource control (RRC) uplink message
from the terminal indicating that a radio link failure
(RLF) report is available; and
transmit a terminal information request message to the
terminal including a request for the RLF report based
on receiving the RRC uplink message,
wherein the performance information report transmitted
by the terminal includes the RLF report based on the
terminal information request message.

11. The apparatus of claim 10, wherein the RLF report
includes:
(1) a synchronization signal block (SSB) frequency, an
SSB subcarrier spacing of an SSB of a previous cell, or
bandwidth part (BWP) information of the previous cell,
wherein the previous cell is: a cell that served the
terminal and experienced a RLF failure, or a handover
target cell that experienced a handover failure, and
wherein the BWP information includes at least one of:
a BWP identifier of a last active BWP in the previous
cell that occurred a failure, a BWP identifier of each
configured BWP in the previous cell, a BWP frequency
domain configuration of the last active BWP, or a BWP
frequency domain configuration of each configured
BWP in the previous cell;

(2) handover information that includes at least one of:
- a handover type indication, a time elapsed from a conditional handover (CHO) command reception to a handover execution, a candidate cell list included in the CHO command, or a triggered event included in the CHO command;
- RLF monitoring beam resource information that includes at least one of: a resource information of a SSB beam configured for RLF monitoring, or a resource configuration for a channel state information reference signal (CSI-RS) beam configured for RLF monitoring;
- or an indication to differentiate a RACH failure caused by a beam failure recovery that includes at least one of: an explicit value in a RLF cause field or an explicit indication apart from the RLF cause field;

(3) supplemental uplink (SUL) information that includes at least one of: an indication that a failure occurred in a SUL carrier or a UL carrier; or an indication that an uplink physical resource block (PRB) usage is for the SUL carrier or the UL carrier; or (4) new radio unlicensed (NR-U) information that includes at least one of: an indication that a failure occurred in a NR unlicensed carrier or a NR licensed carrier; or an indication that an uplink PRB usage is for the NR unlicensed carrier or the NR licensed carrier.

12. The apparatus of claim 9, wherein the apparatus is further caused to:
receive a radio resource control (RRC) uplink message from the terminal indicating that a minimization of drive test (MDT) log report is available,
wherein the terminal information request message includes a request for the MDT log report based on receiving the RRC uplink message,
wherein the performance report transmitted by the terminal includes the MDT log report based on the terminal information request message, and
wherein the MDT log report includes a beam level measurement result of a serving cell or a neighbor cell, the beam level measurement result including at least one of: a beam index, a SSB reference signal receiving power (RSRP), synchronization signal block (SSB) reference signal receiving quality (RSRQ), SSB signal to interference plus noise ratio (SINR), channel state information reference signal (CSI-RS) RSRP, CSI-RS RSRQ, or CSI-RS SINR.

13. An apparatus for wireless communication comprising a processor and a memory storing instructions, execution of which by the processor causes the apparatus to:
receive, from a network node, a terminal information request message or a radio resource control (RRC) configuration message;
generate a performance information report that includes information relating to performance of the network node; and
transmit the performance information report to the network node,
wherein the terminal information request message includes a request for a random-access channel (RACH) report,
wherein the performance information report includes the RACH report based on receiving the terminal information request message transmitted from the network node, and wherein the RACH report includes at least one of: a list of beam indexes associated with beams with which the apparatus has attempted a RACH procedure, a number of preambles sent for each beam with which the apparatus has attempted the RACH procedure, or a synchronization signal block (SSB) or channel state information reference signal (CSI-RS) beam type for each beam with which has attempted the RACH procedure,
wherein the RRC configuration message includes a secondary cell group (SCG) configuration and causes the terminal to operate in a dual connectivity (DC) mode upon a receipt of the RRC configuration message, and
wherein the performance information report includes a SCG failure indication indicating that a SCG failure occurred at the apparatus.

14. The apparatus of claim 13, wherein the apparatus is further caused to:
transmit a radio resource control (RRC) uplink message to the network node indicating that a radio link failure (RLF) report is available,
wherein the terminal information request message includes a request for the RLF report,
wherein the performance information report includes the RLF report based on receiving the terminal information request message from the network node.

15. The apparatus of claim 14, wherein the RLF report includes:

(1) a synchronization signal block (SSB) frequency, an SSB subcarrier spacing of an SSB of a previous cell, or bandwidth part (BWP) information of the previous cell, wherein the previous cell is a cell that served the apparatus and experienced a RLF failure, or a handover target cell that experienced a handover failure, and wherein the BWP information includes at least one of: a BWP identifier of a last active BWP in the previous cell that occurred a failure, a BWP identifier of each configured BWP in the previous cell, a BWP frequency domain configuration of the last active BWP, or a BWP frequency domain configuration of each configured BWP in the previous cell;

(2) handover information that includes at least one of:
- a handover type indication, a time elapsed from a conditional handover (CHO) command reception to a handover execution, a candidate cell list included in the CHO command, or a triggered event included in the CHO command;
- RLF monitoring beam resource information that includes at least one of: a resource information of a SSB beam configured for RLF monitoring, or a resource configuration for a channel state information reference signal (CSI-RS) beam configured for RLF monitoring;
- or an indication to differentiate a RACH failure caused by a beam failure recovery that includes at least one of: an explicit value in a RLF cause field or an explicit indication apart from the RLF cause field;

(3) supplemental uplink (SUL) information that includes at least one of: an indication that a failure occurred in a SUL carrier or a UL carrier; or an indication that an uplink physical resource block (PRB) usage is for the SUL carrier or the UL carrier; or (4) new radio unlicensed (NR-U) information that includes at least one of: an indication that a failure occurred in a NR unlicensed carrier or a NR licensed carrier; or an indication that an uplink PRB usage is for the NR unlicensed carrier or the NR licensed carrier.

16. The apparatus of claim 13, wherein the apparatus is further caused to:
- transmit a radio resource control (RRC) uplink message to the network node indicating that a minimization of drive test (MDT) log report is available,
- wherein the terminal information request message includes a request for the MDT log report,
- wherein the performance information report includes the MDT log report based on receiving the terminal information request message from the network node, and
- wherein the MDT log report includes a beam level measurements result of a serving cell or a neighbor cell, the beam level measurement result including at least one of: a beam index, a synchronization signal block (SSB) reference signal receiving power (RSRP), SSB reference signal receiving quality (RSRQ), SSB signal to interference plus noise ratio (SINR), channel state information reference signal (CSI-RS) RSRP, CSI-RS RSRQ, or CSI-RS SINR.

\* \* \* \* \*

UNITED STATES PATENT AND TRADEMARK OFFICE
CERTIFICATE OF CORRECTION

PATENT NO. : 12,137,357 B2
APPLICATION NO. : 17/400537
DATED : November 5, 2024
INVENTOR(S) : Jianmin Fang et al.

Page 1 of 1

It is certified that error appears in the above-identified patent and that said Letters Patent is hereby corrected as shown below:

In the Claims

Column 15; Line 59:
Delete "handover information that"
Replace with --performance information that--

Column 16; Line 42:
Delete "message including or a radio"
Replace with --message or a radio--

Column 17; Line 29:
Delete "handover information that"
Replace with --performance information that--

Column 19; Line 1:
Delete "handover information that"
Replace with --performance information that--

Column 20; Line 41:
Delete "handover information that"
Replace with --performance information that--

Signed and Sealed this
Twenty-ninth Day of July, 2025

Coke Morgan Stewart
*Acting Director of the United States Patent and Trademark Office*